United States Patent [19]

Newnam

[11] Patent Number: 4,917,447

[45] Date of Patent: Apr. 17, 1990

[54] EXTREME ULTRAVIOLET REFLECTOR

[75] Inventor: Brian E. Newnam, Los Alamos, N. Mex.

[73] Assignee: The United States of America as represented by the Department of Energy, Washington, D.C.

[21] Appl. No.: 306,358

[22] Filed: Feb. 6, 1989

[51] Int. Cl.$^4$ .................. G02B 17/00; G02B 1/10; H01S 3/081

[52] U.S. Cl. .................. 350/1.1; 350/622; 250/504 R; 372/99

[58] Field of Search .................. 350/1.1, 622; 250/504 R; 372/94, 99

[56] References Cited

U.S. PATENT DOCUMENTS 3,826,996  7/1974  Jaegle et al. .................. 250/504 R

OTHER PUBLICATIONS

A. V. Vinogradov et al., "On Wide-Band Mirrors for Soft X-Ray Range", 47 Opt. Comm. No. 6, pp. 361-363, (Oct. 1983).

M. L. Scott et al., "Extreme Ultraviolet Reflectance Degradation of Aluminum and Silicon from Surface Oxidation", 27 Appl. Opt. No. 8, pp. 1503-1507 (Apr. 1988).

*Primary Examiner*—Bruce Y. Arnold
*Assistant Examiner*—Terry S. Callaghan
*Attorney, Agent, or Firm*—Ray G. Wilson; Paul D. Gaetjens; William R. Moser

[57] ABSTRACT

A multi-faceted mirror forms a retroreflector for a resonator loop in a free electron laser (FEL) operating in the XUV ($\lambda = 10$–100 nm). The number of facets is determined by the angle-of-incidence needed to obtain total external reflectance (TER) from the facet surface and the angle through which the FEL beam is to be turned. Angles-of-incidence greater than the angle for TER may be used to increase the area of the beam incident on the surface and reduce energy absorption density. Suitable surface films having TER in the 10–100 nm range may be formed from a variety of materials, including Al, single-crystal Si, Ag, and Rh. One of the facets is formed as an off-axis conic section to collimate the output beam with minimum astigmatism.

3 Claims, 8 Drawing Sheets

EXTREME ULTRAVIOLET REFLECTOR

BACKGROUND OF THE INVENTION

This invention relates to mirrors for use in laser resonators and, more particularly, to mirrors operable in the extreme ultraviolet for use with a free electron laser (FEL). This invention is the result of a contract with the Department of Energy (Contract No. W-7405-ENG-36).

There are numerous applications which require tunable sources of coherent radiation operating in the extreme ultraviolet (XUV) wavelength range of 10-100 nm. FEL oscillators and amplifiers have produced radiation at wavelengths less than 500 nm. RF linacs, such as available at Los Alamos National Laboratory, can extend FEL operation below 100 nm. A high brightness electron beam developed at the Los Alamos National Laboratory can provide an electron beam to the linac that will more than meet requirements for FELs operating at XUV wavelengths as short as 10 nm. Further, FEL gain can be increased by providing long undulators to increase the number of undulator periods. The FEL gain can be further increased with an undulator geometry that provides equal, 2-plane magnetic focusing from a distributed quadrupole field or by sextuple focusing. Further, the magnitude of individual, random magnet errors that can be tolerated can be increased from below 0.1% to the order of 0.7% by periodic undulator segmentation and correction. However, a major problem with extension of the FEL to the XUV is the inherently low reflectance of available resonator mirrors for the FEL oscillator. The small-signal gain for the FEL decreases monotonically with decreasing wavelength to the $\frac{1}{2}$ power. To balance the requirements on the electron beam, magnetic undulator, and resonator mirrors, a minimum acceptable resonator reflectance of 40% is adopted as a threshold resonator reflectance for XUV wavelengths. Even with this threshold value, the single-pass small-signal gain must exceed 625% just to reach an oscillation threshold. Similarly, with a mirror reflectance of 60%, a minimum small-signal gain of 280% is required.

Below 100 nm, normal incidence-type reflectors are not available with the required reflectance. Chemically vapor-deposited, single-crystal, silicon carbide mirrors have been produced with a reflectance of 40-50% for wavelengths between 60 and 220 nm, with the reflectance dropping to less than 10% for $\lambda < 60$ nm. On simple metallic films, the 40% reflectance is obtained only for $\lambda > 250$ nm, except for freshly deposited aluminum in ultra-high vacuum ($\sim 10^{-10}$ torr), which can produce a normal-incidence reflectance greater than 40% for wavelengths as short as 80 nm. For $\lambda > 120$ nm, $MgF_2$ overcoated Al films are capable of reflectances of 80% for normal-incidence radiation. Multilayer thin-film structures have yielded reflectances up to 60% only for XUV wavelengths near 15 nm and only over a narrow bandwidth limited to about 7%. Accordingly, normal-incidence mirror technology does not appear suitable for FEL extension to the XUV.

A single, cylindrical mirror configuration for use with soft X-rays, i.e. radiation with $5 \text{ nm} \leq \lambda \leq 15 \text{ nm}$, has been suggested by A. V. Vinogradov et. al., "On Wide-Band Mirrors for Soft X-ray Range," 47 Opt. Commun, No. 6, pp. 361-363 (October 1983). The paper predicts that a coating of Rh will provide a reflectance greater than 40% at a wavelength of about 12 nm on a cylindrical surface, rotating the incident light through an angle of 180° using total external reflectance. However, cylindrical surfaces introduce substantial astigmatism that degrades beam quality.

These and other problems of the prior art are addressed by the present invention and a FEL retroreflector is provided for use with XUV wavelengths in the range 10-100 nm.

Accordingly, it is an object to the present invention to reflect incident light of wavelength 10-100 nm through 180° with a reflectivity of at least 40%.

It is another object of the present invention to reflect high-power laser beams with high reflectance over a broad bandwidth.

It is another object of the present invention to provide a retroreflector which does not introduce beam degradation such as astigmatism.

One other object of the present invention is to provide a retroreflector which can produce a collimated output beam.

Yet another object of the present invention is to provide a retroreflector with mirror surfaces effective to spread the incident beam for reduced energy absorption density.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a retroreflector for use in a resonator loop of a free electron laser (FEL) beam having operating wavelengths in the range of 10-100 nm. A number of individual mirror facets form the reflective surface, where each facet is arranged to receive light at an angle of incidence effective for total external reflectance from the reflective surface. The number of facets is selected to reflect the incident light through 180° while providing a total reflectance of at least 40% for the selected number of facets within the wavelength range of 10-100 nm. Each reflective surface is a vacuum deposited material. The planar reflective surfaces do not introduce astigmatism and the large angle of incidence effectively spreads the beam energy over an increased surface area. Further, the planar reflective surfaces can be coated directly in a vacuum and maintained in a vacuum for use in a FEL resonator.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with the present invention, a retroreflector uses total external reflectance (TER) to provide a net reflectance of >40% effective for use in an FEL resonator at XUV wavelengths. TER occurs when the angle of incidence exceeds a critical angle, $\theta_c$, defined by $\sin \theta_c = n_2/n_1$, where $n_1$ is the refractive index of the incident medium and $n_2$ is the refractive index of the mirror. In an FEL resonator, the incident medium is a vacuum ($n_1 = 1.0$), so $n_2$ must be less than 1.0 in order to provide a TER capability.

It is known that a few materials have a real part, n, of the refractive index ($n = n + ik$) less than 1.0 in the XUV range. Although 100% TER cannot be obtained, a large reflectance can still be obtained if the imaginary part of the index, k, or the absorption ($\alpha = 4\pi k/\lambda$) is small. It is also found that higher values of reflectance are obtained with S-Polarized light than with P-polarization.

Figure 1:
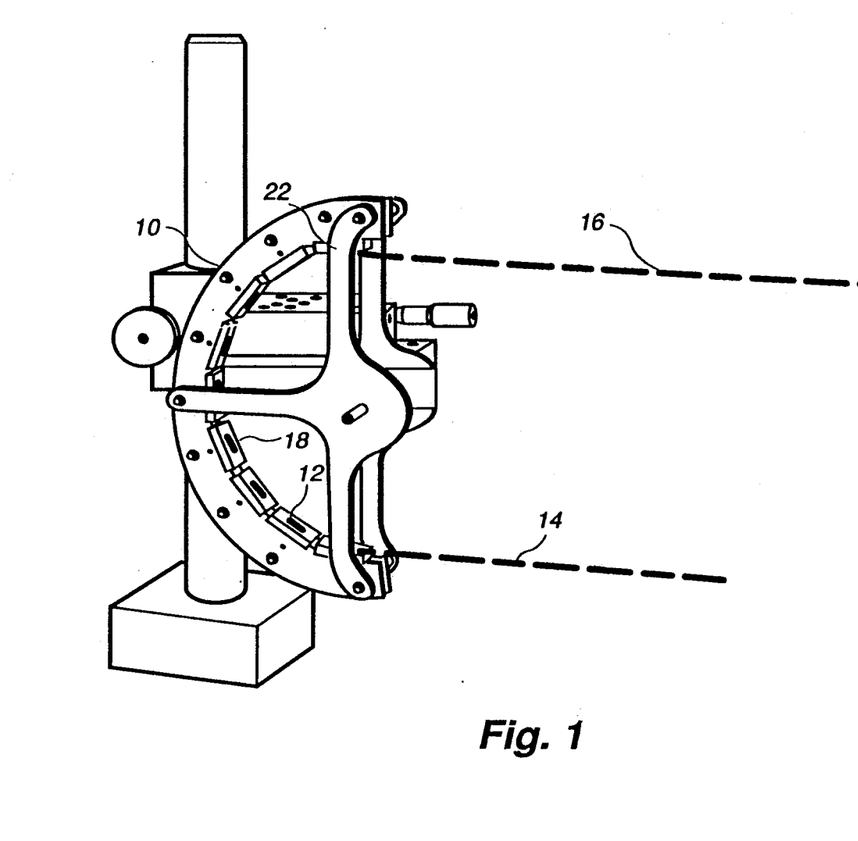
FIG. 1 is a pictorial representation of a multi-faceted retroreflector recording to the present invention.

FIG. 1 depicts a retroreflector 10 in accordance with the present invention. A number of mirrored facets 12 are arranged to receive an incident laser beam 14 at an angle exceeding the critical angle for TER. The minimum number of facets is determined by the critical angle-of-incidence and the need to redirect incident beam 14 to form retroreflected beam 16. The number of facets may be varied to optimize the reflectivity.

In a preferred embodiment, facet 22 is configured to be an off-axis conic section for collimating output beam 16. Facet 22 may be any facet within retroreflector 10, although an end location is preferred, and any off-axis conic section. e.g., paraboloid or ellipsoid, may be selected to collimate output beam 16 and minimize astigmatism. It will be appreciated that the high value of TER for suitable materials, along with the large area of incidence of the beam arising from the large angle of incidence, provides a low absorbed energy density and a corresponding relatively high resistance to laser damage and thermal distortion. Indeed, in some applications it may be desirable to increase the angle-of-incidence greater than the minimum value for TER in order to further spread the area of the beam incident on the surface and reduce the incident energy density.

Figure 2:
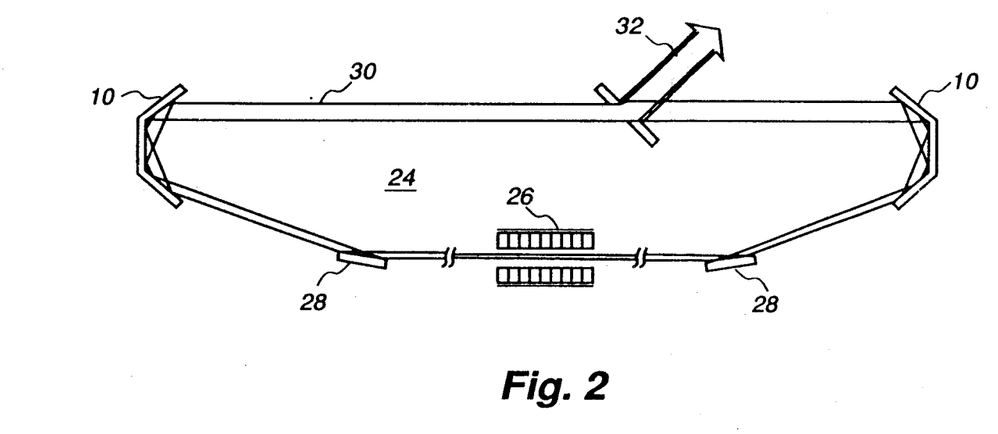
FIG. 2 is a schematic showing an FEL resonator ring using multi-faceted retroreflectors.

FIG. 2 schematically depicts an FEL resonator loop 24. Laser beam 30 is amplified by undulator 26 and may be output and input through beam expansion and contraction mirrors 28. Mirrors 28 may be provided by a surface of SiC, Si, Rh, or Ag on intra-cavity grazing incidence hyperboloid mirrors. Retroreflectors 10 direct beam 30 around resonator loop 24. Output beam 32 is formed from beam 30. Retroreflectors 10 have reflectivities which cooperate with the single pass optical gain through wiggler 26 at XUV wavelengths for system oscillation. A reflectance $\geq 40\%$ is compatible with projected FEL oscillators at wavelengths below 100 nm. Planar undulator 26 is aligned at an azimuthal angle relative to mirrors 10 and 28 to produce the S-Plane polarized light preferred for TER. Four materials have been investigated for suitable TER surfaces in accordance with the present invention: Al, Si, Ag, and Rh.

Figure 3:
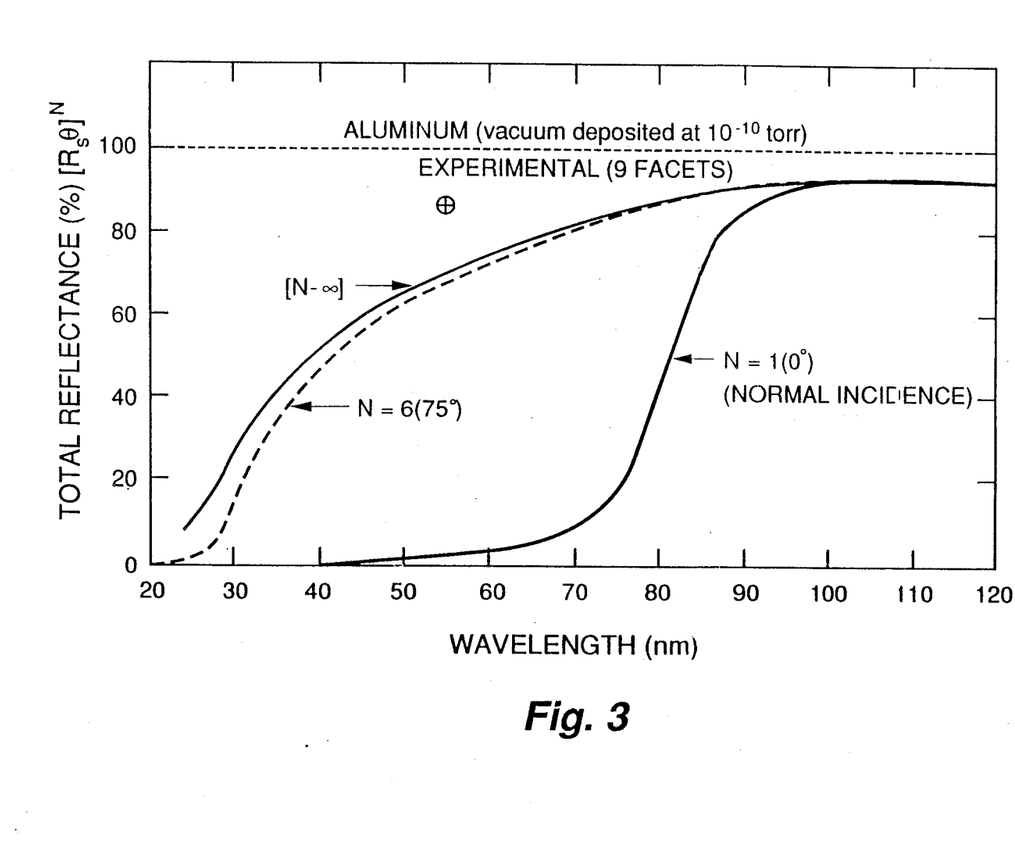
FIG. 3 graphically shows the predicted retroreflectance versus XUV wavelength for Al films deposited in ultra-high vacuum on a multi-faceted mirror of N facets and illustrating one experimental data point at 58.4 nm for a nine facet mirror.

FIG. 3 illustrates the predicted reflectance of an Al mirror deposited on a smooth SiC substrate in ultra-high vacuum. Based on tabulated optical constants (e.g., E. D. Palik, Ed., Handbook of Optical Constants of Solids (Academic, Orlando, Fla., 1985)), the reflectance obtainable with multi-facet mirrors below 90 nm with Al films is much greater than for a single, normal-incidence mirror, i.e.. a single facet, for total retroreflectance. Further, the reflectance exceeds 40% over a very wide bandwidth. An experimental data point of 89% reflectance at 58.4 nm for a nine (9) facet mirror indicates that the tabulated values were obtained using partially contaminated films.

Figure 4:
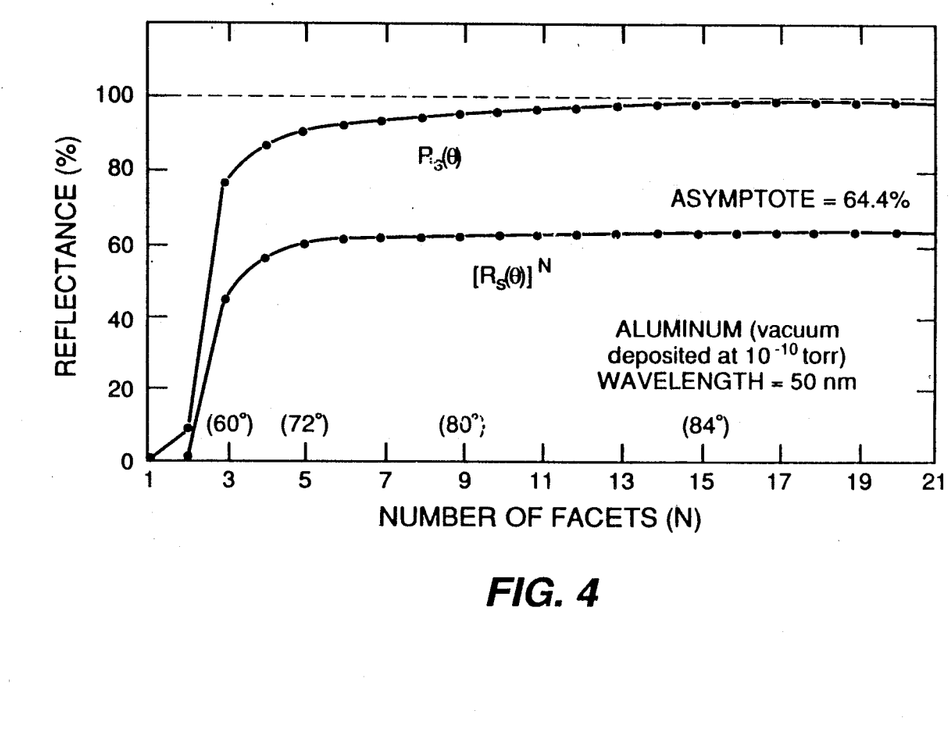
FIG. 4 graphically shows the calculated retroreflectance and single-facet reflectance for XUV radiation at 50 nm on a multi-faceted Al surface.

FIG. 4 shows the calculated retroreflectance and single-facet reflectance for S-polarized XUV radiation at 50 nm for Al films deposited as for FIG. 3. Note that only three facets are needed to exceed a threshold 40% reflectance and only five facets to reach a preferred 60% reflectance. As discussed below, the Al film must be relatively unoxidized and uncontaminated to obtain the desired reflectance.

Figure 5:
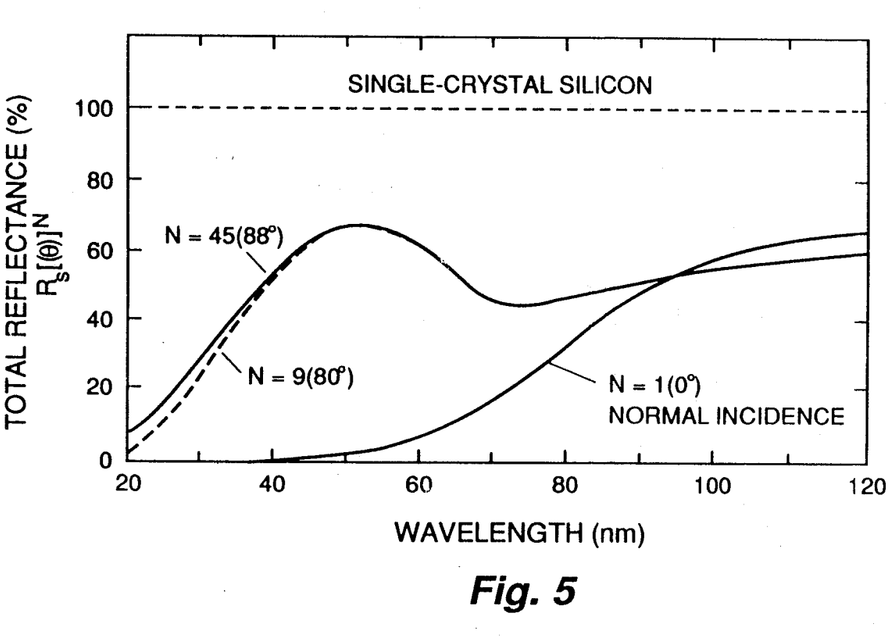
FIG. 5 graphically shows the predicted retroreflectance versus XUV wavelength for a crystalline Si film deposited on a multi-faceted surface.

FIG. 5 shows the calculated total retroreflectance versus XUV wavelength for S-polarized light incident on multi-facet crystalline Si films deposited on a smooth Si substrate in an ultra-high vacuum. The desired total reflectance of $\geq 40\%$ occurs for wavelengths longer than 35 nm.

Figure 6:
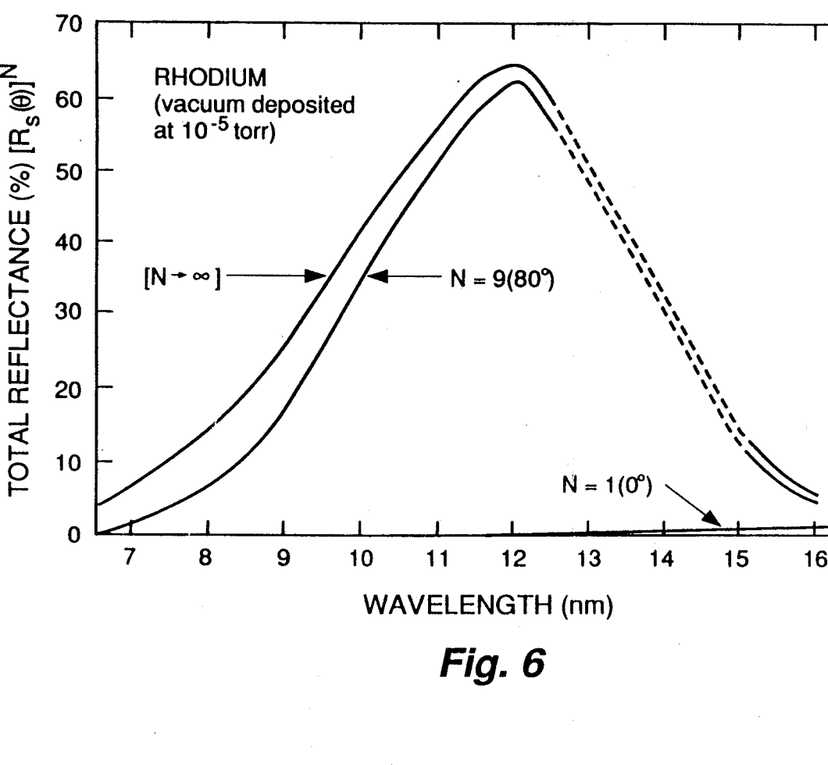
FIG. 6 graphically shows the predicted retroreflectance of a multi-faceted Rh coated retroreflector.
Figure 7:
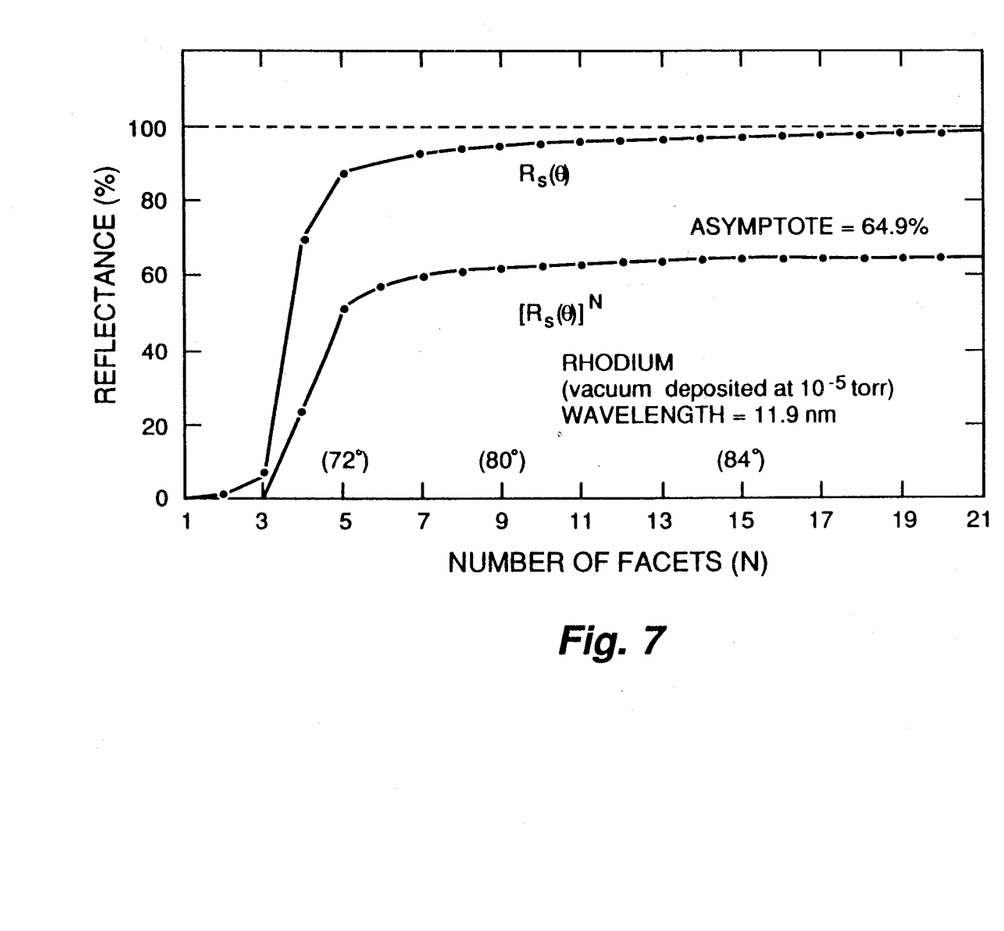
FIG. 7 graphically shows the calculated retroreflectance and single-facet reflectance for a multi-faceted Rh film at XUV radiation of 11.9 nm.

FIGS. 6 and 7 depict the calculated reflectance of Rh coatings on smooth SiC substrates for S-polarized radiation. A calculated reflectance greater than 60% occurs around 12 nm for retroreflectors. A 60% net reflectance is obtained with only 7 facets, with a maximum available reflectance of 64.9%. From the available choices of Al, single crystal Si, and Rh films, a retroreflector for an FEL oscillator in the XUV, 10. to 100 nm, can be fabricated. Other materials which might be suitable in the soft X-ray region below 14 nm include Re (12 nm), Os (12 nm), Mo (12 nm), Ag (9.5 nm), Au (10 nm), Indium (7.5 nm), La (6.5 nm), and Ba (5.5 nm), where the wavelength of maximum TER is parenthetically indicated. Degradation from oxide growth is not expected to be a serious problem on the surfaces, although carbon epifilm growth must be restricted by system cleanings.

To obtain the TER enhancement in retroreflection from a multi-facet mirror, surface oxidation, carbon contamination, and surface roughness must be controlled. Oxide contamination is a serious threat to Al and Si and is less of a threat to Ag and Rh. The rate of oxide film growth is directly proportional to the oxygen or water partial pressure in the vacuum system. As shown in the Scott et al. article, depositing Al and Si films in an ultra-high vacuum of $10^{-9}$ to $10^{-10}$ torr will result in only very slow oxide growth. Carbon film contamination of only a few angstroms can seriously degrade Al mirror performance. Carbon contamination is controlled by eliminating carbonaceous compounds from the vacuum environment and by use of an ultra-high vacuum ($10^{-10}$ to $10^{-11}$ torr).

Scattering of light out of the specularly reflected beam due to surface roughness can be minimized by depositing the films on smooth substrates and using the films at high angles-of-incidence. For XUV wavelengths $\geq 30$ nm, mirror substrates with a small rms surface roughness of $\geq 5$ Å should be sufficiently smooth: scattering losses are predicted to be $<0.1\%$ at an 80° angle-of-incidence based on calculations using the so-called DeBye-Waller factor. Similarly, for soft X-rays around 12 nm, a 5 Å rms surface roughness is estimated to result in 0.8% scattering from each facet.

Referring again to the FIG. 1 retroreflector, a nine-facet 12 retroreflector assembly 10 was fabricated with Al surfaces on Si substrates having an 0.5 nm rms surface roughness. The Al was deposited at a pressure of $5 \times 10^{-10}$ torr, pumped with hydrocarbon-free pumps to avoid carbon contamination. The deposition rate was 0.1 nm per second to obtain a film thickness of 70 nm. The resulting retroreflector provided a reflectance of $89 \pm 3\%$ at 58.4 nm, substantially better than the asymptotic value of 64.4% calculated from tabulated optical constants, as shown in FIGS. 3 and 4.

Figure 8:
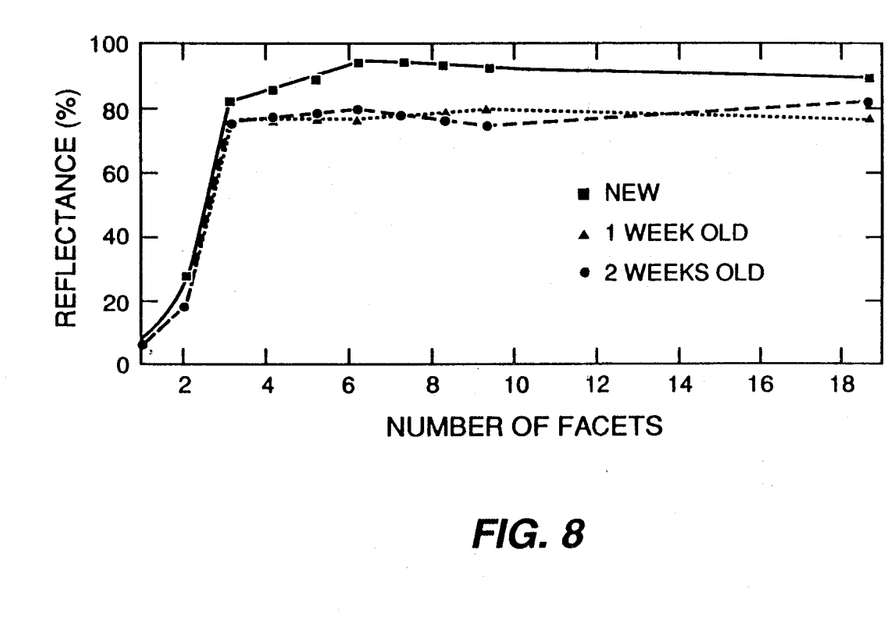
FIG. 8 graphically shows the calculated retroreflectance for an Al film maintained in an ultra-high vacuum environment of $2 \times 10^{-9}$ torr for an extended period of time.

To determine the effect of surface oxidation over an extended time period in a vacuum environment, a single Al oxidized facet was formed by overcoating a previously oxidized sample at $5 \times 10^{-10}$ torr. The reflectance curves at 58.4 nm of FIG. 8 were obtained on the new film, after one week, and after two weeks, with the film maintained in a vacuum environment of $2 \times 10^{-9}$ torr, as reported in M. L. Scott et al., "Extreme Ultraviolet Reflectance Degradation of Aluminum and Silicon from Surface Oxidation," 27 App. Opt. No. 8, pg. 1503 (Apr. 15, 1988), incorporated herein by reference. The dotted curve fitted to the data indicates the presence of 0.085 nm (0.25 monolayers) of Al oxide on the surface, assuming all of the degradation was due to the oxide formation. The reflectance data of FIG. 8 indicate that a net retroreflectance of greater than 75% at 58.4 nm can be maintained for an extended period of time. The results also indicate that an oxide-coated surface can be periodically restored by overcoating, provided that surface roughness does not become a problem. It may also be possible for an ion gun to be mounted in the vacuum chamber for cleaning the bare surface prior to overcoating.

The foregoing description of the preferred embodiments of the invention have been presented for purposes of illustration and description. It is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A retroreflector for use in a resonator loop of a free electron laser beam having operating wavelengths in the range of 10–100 nm, comprising:
   a number of facets having planar reflective surfaces, each facet arranged to receive light at an angle of incidence effective for total external reflectance from said reflective surface, said number being selected to reflect said incident light through an angle completing said resonator loop while providing a total reflectance of at least 40% for said number of facets within said wavelength range of 10–100 nm, each said reflective surface being a vacuum-deposited metal and one of said facets defines an off-axis conic section effective to collimate said laser beam.

2. A retroreflector according to claim 1, wherein said deposited material is selected from the group consisting of Al, single-crystal Si, Ag, and Rh.

3. A retroreflector according to claim 2, wherein said conic section is an off-axis paraboloid or an off-axis ellipsoid and said deposited material is Al.

* * * * *